(12) United States Patent
Calvert

(10) Patent No.: US 6,634,700 B1
(45) Date of Patent: Oct. 21, 2003

(54) AERODYNAMIC TRAILER

(75) Inventor: Phillip D. Calvert, Houston, TX (US)

(73) Assignee: 5 Star Product Design & Development Group, Inc., Center, TX (US)

(*) Notice: Subject to any disclaimer, the term of this patent is extended or adjusted under 35 U.S.C. 154(b) by 0 days.

(21) Appl. No.: 10/211,918

(22) Filed: Aug. 2, 2002

(51) Int. Cl.[7] .................................................. B60J 1/00
(52) U.S. Cl. .......................... 296/180.4; 296/180.1; 296/181; 296/901
(58) Field of Search ..................... 296/180.4, 181, 296/100.01, 901, 182, 183, 24.2, 191, 180.1; 280/204, 423.1

(56) References Cited

U.S. PATENT DOCUMENTS

| | | | | |
|---|---|---|---|---|
| 3,823,975 A | * | 7/1974 | Cooper | 296/173 |
| 4,018,472 A | | 4/1977 | Mason, Jr. | 296/1 S |
| 4,180,290 A | * | 12/1979 | Drews | 296/185 |
| 4,284,302 A | | 8/1981 | Drews | 296/180.1 |
| 4,343,506 A | * | 8/1982 | Saltzman | 296/180.2 |
| 4,355,834 A | * | 10/1982 | Alford | 296/180.4 |
| 4,372,568 A | * | 2/1983 | Campbell | 296/173 |
| 4,378,898 A | | 4/1983 | Smeenge et al. | 224/328 |
| 4,408,792 A | | 10/1983 | Sullivan | 296/1 S |
| 4,457,546 A | * | 7/1984 | Wiant et al. | 296/901 |
| 4,458,937 A | | 7/1984 | Beckmann et al. | 296/1 S |
| 4,776,535 A | * | 10/1988 | Paterson et al. | 296/180.4 |
| 4,813,635 A | * | 3/1989 | Paterson et al. | 244/130 |
| 4,858,943 A | * | 8/1989 | Cote | 280/414.1 |
| 4,874,184 A | * | 10/1989 | Boyer | 296/181 |
| 4,904,015 A | | 2/1990 | Haines | 296/180.3 |
| 4,911,348 A | * | 3/1990 | Rasor et al. | 224/321 |
| 4,934,302 A | | 6/1990 | Harper | 114/361 |
| 5,249,821 A | * | 10/1993 | Ricketts et al. | 280/638 |
| 5,249,836 A | * | 10/1993 | Stanesic et al. | 296/180.1 |
| 5,280,990 A | * | 1/1994 | Rinard | 296/180.4 |
| 5,286,079 A | * | 2/1994 | Zubko et al. | 296/181 |
| 5,439,151 A | * | 8/1995 | Clayton | 280/769 |
| 5,538,315 A | * | 7/1996 | Dixon | 296/180.4 |
| 5,653,494 A | * | 8/1997 | Cleall et al. | 296/901 |
| 5,681,074 A | * | 10/1997 | Christensen | 296/181 |
| 5,941,595 A | * | 8/1999 | Schroeder et al. | 296/180.1 |
| 6,065,800 A | * | 5/2000 | Olson | 296/190.08 |
| 6,068,328 A | * | 5/2000 | Gazdzinski | 296/180.1 |
| 6,089,650 A | * | 7/2000 | Edgeller et al. | 296/181 |
| 6,131,853 A | * | 10/2000 | Bauer et al. | 244/113 |
| 6,217,106 B1 | * | 4/2001 | Reckner, Jr. | 296/173 |
| 6,276,636 B1 | * | 8/2001 | Krastel | 296/180.1 |
| 6,398,290 B1 | * | 6/2002 | Williams et al. | 296/181 |
| 6,488,329 B1 | * | 12/2002 | Smith | 296/100.07 |

* cited by examiner

*Primary Examiner*—Kiran Patel
(74) *Attorney, Agent, or Firm*—Locke Liddell & Sapp LLP

(57) ABSTRACT

The present invention provides a molded trailer shell that can be coupled to a frame, a trailer hitch, and one or more wheels to form a trailer. The trailer shell is advantageously formed by rotational molding. In at least one embodiment, the trailer shell includes a front, two sides, a top, and various external ribs molded with the shell. Further, the ribs can be shaped to aerodynamically channel the air to produce a stable towing trailer.

27 Claims, 4 Drawing Sheets

AERODYNAMIC TRAILER

FIELD OF THE INVENTION

The present invention relates to mobile carriers. Particularly, the invention relates to trailers.

BACKGROUND OF THE INVENTION

Mobile carriers have been used since nearly the beginning of humans. With the advent of the wheel and the advent of vehicles, such as automobiles, trailers became a common platform to carry items. Typically, a trailer includes a frame made of strong metal, such as steel or aluminum, an axle containing one or more wheels attached to the frame, and an optional body attached to the frame to cover the trailer storage area. The trailer body is generally made of aluminum due to its relatively low cost and especially its light weight. Structural members are generally attached to the inside of the body. Generally, to provide needed stiffness and structural integrity, structural members are either welded, riveted, or bolted to the inside of the body. This construction allows the exterior to be smooth to lessen wind drag, but also lessens valuable storage space.

As a separate issue, there are at least two design difficulties that have plagued designers. The first is weight. Although the production of vehicles with more powerful engines allows the use of larger trailers, the weight of the trailers is cumbersome. In many cases, the trailer is too large to lift by hand to connect to the vehicle. Typically, the front part of the trailer that the vehicle connects to is called the "tongue" and contains a trailer hitch. On larger trailers, the tongue and hitch are raised through mechanical, hydraulic, or pneumatic mechanisms, the vehicle backs up to the trailer hitch, the trailer hitch is lowered onto a connecting portion on the vehicle, and the connection is made for pulling or other use. Even smaller trailers can sometimes be quite cumbersome from the front weight called "tongue weight" or from just the mass of the body and frame. Thus, some individuals are not able to easily maneuver even smaller sized trailers because of its inherent structural weight.

The second problem is stability of the trailer. The stability of the trailer can determine the safety of the trailer and, thus, the trip in which the trailer is used. A trailer can sway from side to side due to a poor design, uneven loading, or other factors. It is known that an unstable trailer has caused vehicle accidents. In some cases, an unstable and swerving trailer has been known to even overturn the pulling vehicle. Stability is particularly sensitive on smaller trailers. Further, enclosed vehicles typically have a higher center of gravity due to the higher enclosing structure and can have increased tendency to become unstable.

The size of smaller trailers can particularly cause difficulty in stability. Thus, in trying to meet both of the above design challenges of weight and stability, a small, lightweight trailer can meet the first challenge, but fail the second challenge.

Therefore, there remains a need for a lightweight trailer that can retain a reasonable amount of stability even for small sizes. Further, there remains a need for a lightweight, stable trailer that can increase the amount of storage space used for structural members in the storage area of the trailer, but still offer aerodynamic designs to reduce wind drag. The present invention answers these needs.

SUMMARY OF THE INVENTION

The present invention provides a molded trailer shell that can be coupled to a frame, a trailer hitch, and one or more wheels to form a trailer. The trailer shell is advantageously formed by rotational molding. In at least one embodiment, the trailer shell includes a front, two sides, a top, and various external ribs molded with the shell. Further, the ribs can be shaped to aerodynamically channel the air to produce a stable towing trailer.

In general, the invention provides an aerodynamic trailer, which includes a trailer frame comprising a forward portion, a rearward portion, and a trailer hitch disposed on the forward portion. A molded shell is coupled to the frame, the shell comprising a top fin disposed longitudinally along a top of the shell and extending outwardly from a top face of the shell.

The invention also provides an aerodynamic trailer comprising a frame, a trailer hitch coupled to the frame, a wheel coupled to the frame, and a molded shell coupled to the frame. The shell comprises a top defining a top face and having a top fin extending longitudinally along the top, a side defining a side face and having a side fin extending vertically along said side, a wind scoop having a tapered surface disposed on the top and in proximity to a rearward portion of the trailer, and a front defining a front face and coupled to the top and side. The invention also provides a trailer shell, comprising a top, a side, and a front of the trailer shell integrally formed by a process of rotational molding.

In a further embodiment, a method of forming a molded trailer shell is provided, comprising placing a moldable material in a rotational molding machine having a mold, the material being sufficient to form a molded trailer shell, spinning a portion of the rotational molding machine in multiple axis to form the trailer shell, and extracting the trailer shell from the rotational molding machine.

BRIEF DESCRIPTION OF THE DRAWINGS

A more particular description of the invention, briefly summarized above, may be realized by reference to the embodiments thereof that are illustrated in the appended drawings and described herein. However, it is to be noted that the appended drawings illustrate only some embodiments of the invention. Therefore, the drawings are not to be considered limiting of its scope, for the invention may admit to other equally effective embodiments.

DETAILED DESCRIPTION OF THE INVENTION

The trailer of the present invention can be molded in a wide variety of shapes, sizes, heights, lengths, widths, ratios, structures, assemblies and other aspects. The embodiment shown herein is merely representative of the underlying principles of the present invention, recited in the claims, and is not limiting of the present invention.

Figure 1:
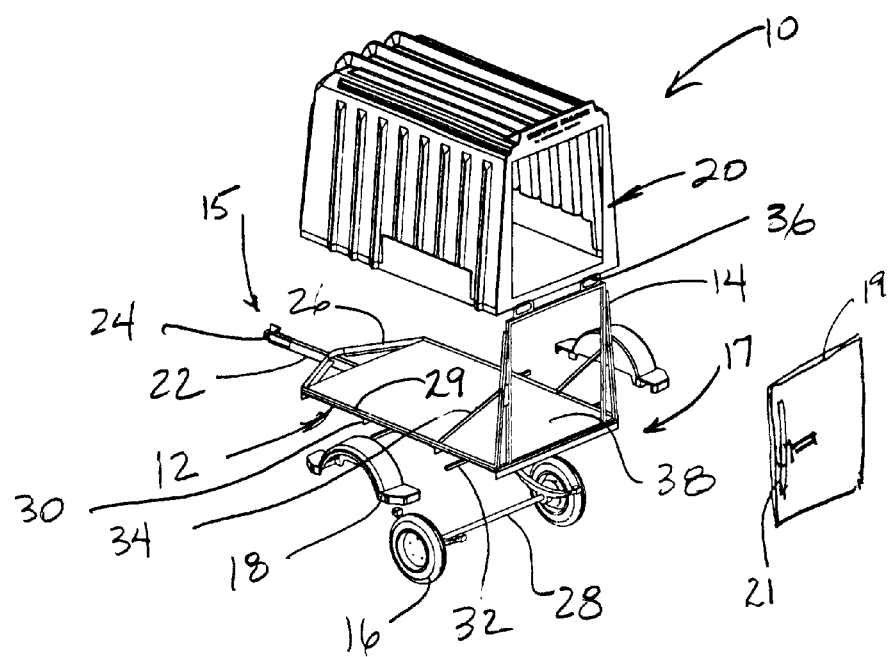
FIG. 1 is a schematic exploded view of one embodiment of a trailer.

FIG. 1 is a schematic exploded view of one embodiment of a trailer. The trailer 10 generally includes a forward portion 15 and a rearward portion 17 disposed distally from the forward portion 15. The forward portion 15 can include a tongue 22 and a trailer hitch 24 connected to the tongue 22. The trailer hitch is used to couple the trailer to a towing vehicle (not shown). Further, the trailer 10 generally includes a frame 12 with an optional door frame 14, one or more wheels 16 coupled to the frame, one or more optional fenders 18 coupled to the frame in proximity to the wheel, and a shell 20 coupled to the frame. The term "coupled," "coupling," and like terms are used broadly herein and can include any method or device for securing, binding, bonding, fastening, attaching, joining, inserting therein, forming thereon or therein, communicating, or otherwise associating, for example, mechanically, magnetically, electrically, chemically, directly or indirectly with intermediate elements, one or more members together, or portions thereof, and can further include integrally forming one functional member with another. The coupling can occur in any direction, including orthogonally or rotationally. Advantageously, the shell 20 can be molded as described herein.

The trailer frame 12, shown in the figures, is one example of a trailer frame that includes typical features found in trailers and it should be understood that the structure and layout is merely exemplary and non-limiting. In the exemplary embodiment, the frame is a separate structure from the shell. Alternatively, the shell and frame can be molded together.

The tongue 22 and hitch 24 extend forward of the main portion of the frame. The hitch 24 can be any number of standard or custom configurations designed to couple a trailer to a towing vehicle. The frame 12 can include a one or more structural members extending forward of the main platform, herein designated the noseframe 26. The noseframe 26 can be used to help couple the front of the shell 20 to the frame 12.

Siderails 29 can form a longitudinal and/or outer structure of the trailer toward the rearward portion of the frame 12 from the noseframe 26. The siderails 29 can also be used to couple the shell 20 to the frame 12. Crossrails 30 can be coupled side-to-side to the siderails 29 to give lateral stability to the trailer. One or more fender supports 32 can extend outwardly from the frame 12, such as from the siderails 29. The fender supports 32 can be used to support a fender 18 coupled thereto.

Generally, a door 19 is coupled to the frame 12 using, for example, a door frame 14 to support the door. To help support the door frame 14 to other portions of the frame 12, one or more struts 34 can be coupled to the door frame and the siderails 29 or other portions of the frame 12. The door 19 can be hingeably or otherwise coupled to the shell 20 and/or the door frame 14. A latch 21 can secure the door. The door frame 14 can also include one or more optional taillight brackets 36 for mounting taillights and/or brake lights for safety and regulatory concerns.

A deck 38 can be disposed on the frame 12. The deck can include plywood, metal, plastic, or other structural materials that would support an intended load on or in the trailer.

Figure 2:
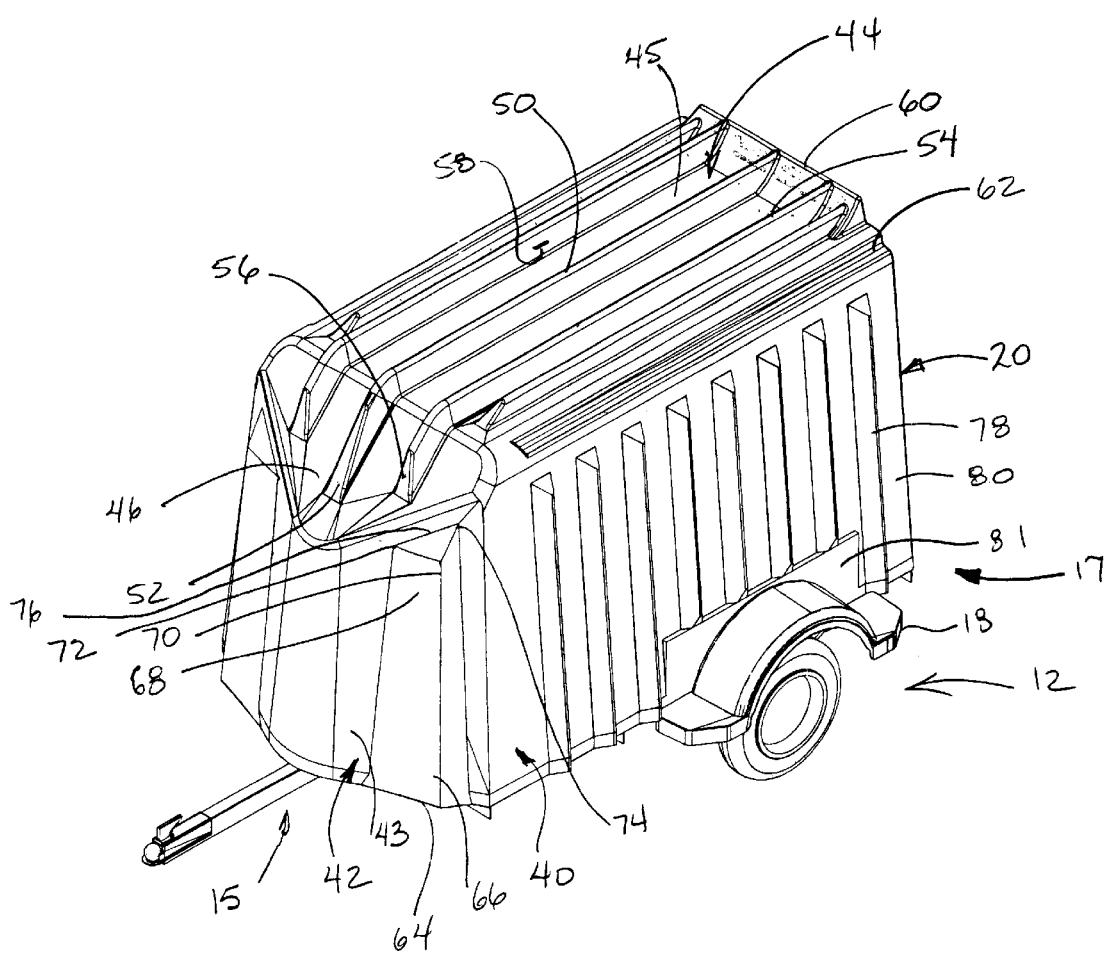
FIG. 2 is a schematic perspective frontal view of the trailer of FIG. 1.

FIG. 2 is a schematic perspective frontal view of the trailer of FIG. 1. Advantageously, the shell 20 can be molded in substantially one piece. Alternatively, the shell 20 can be molded or otherwise formed in one or more pieces and assembled. The shell is generally coupled to the frame. For example, in one embodiment, when the shell is formed separately from the frame, the shell can be threadedly attached to the frame such as through self-tapping screws, bolts, or other fasteners.

The present invention can include one or more fins, described herein, that are molded integrally with the shell 20 or formed separately and assembled to the remainder of the shell 20. The fins help channel air flowing by the trailer to stabilize the trailer. Generally, the fins described herein are molded in a hollow fashion in keeping with general molding techniques so that the various structural walls throughout the shell 20 are relatively uniform for consistent shrinkage, time/temperature concerns, and other uniformities.

In general, the shell 20 includes sides 40, a front 42 extending between the sides, and a top 44 extending from the front 42 rearwardly between the sides 40. Further, the shell 20 includes a tapered surface 46 coupled between the top 44 and the front 42. The tapered surface 46 helps deflect air currents from a towing vehicle (not shown).

In at least one embodiment, the top 44 can include a top fin 50. The top fin 50 extends longitudinally from the front 42 rearwardly. The top fin 50 advantageously extends above the top face 45 of the top 44. The fin can include a forward sloping surface 52, formed at the front of the top fin 50. In at least one embodiment, the forward sloping surface 52 extends at least partially down the length of the tapered surface 46.

The top fin 50 can be formed with a tapered cross-section, in that the thickness or width of the top fin near the top face 45 is a first dimension and the first dimension generally decreases as the distance from the top face increases. While the tapered surfaces shown herein are generally straight along the surface, it is to be understood that such tapered surfaces can be curved in some fashion.

One or more other top fins, such as top fin 54, can be disposed laterally from the top fin 50. The second top fin 54 can also include a forward sloping surface 56. The forward sloping surface 56 can also extend down the tapered surface 46 of the shell. Other top fins (not labeled) can optionally not extend down the tapered surface 46.

An air channel 58 is formed between the top fins 50, 54. The air channel 58 is believed to increase the stability of the trailer 10 by acting as a funneled and restricted guide to air currents traveling over the top of the trailer 10. If, for example, the top fins 50, 54 are several inches high, then an air layer of similar height is trapped between the fin 50 and fin 54 and under the air traveling above the fins. This funneled air flowing through the air channel 58 is advantageously used to reduce the side-to-side sway that heretofore has been prevalent in trailers, especially smaller trailers. As shown in FIG. 2, multiple air channels can be created between multiple top fins. The height of the top fins can vary between each other, as may be conducive to distributing air currents across the top 44.

Further, the top 44 can include a wind scoop 60. One or more of the top fins 50, 54 can be coupled to the wind scoop 60 so that a smooth air flow occurs. The wind scoop 60 can force the air trapped between the top fins upwardly, causing a downward force on the trailer 10. The downward force can increase the stability, decrease bounce, and/or increase traction on a road surface.

A corner groove 62 can form a transition between the top 44 and side 40. The corner groove 62 can assist in two aspects. First, the corner groove can form yet another channel through which the air currents can be directed. Secondly, the corner groove can add structural stability to the corner by creating multiple faceted surfaces.

A front fin 64 can similarly be formed on the front 42 of the shell 20. Advantageously, a lower section 66 of the front fin 64 can be wider and shallower than a corresponding upper section 68 of the front fin 64. The differences in cross sections can be used advantageously to direct eddy currents occurring from the towing vehicle in front of the trailer 10 and other air flow. For example, eddy currents can whip around the sides of the towing vehicle and cause turbulence on the front 42. The lower section 66 can be used to deflect and/or channel some of the eddy currents more smoothly across the front and/or side of the trailer. It is believed that the upper section 68 will encounter less air turbulence from the side and encounter more air currents over the top of the vehicle. In other embodiments, the configurations of the upper and lower cross sections can be reversed. One or more other front fins can be formed on other portions of the front 42. Further, the front fin can be tapered in cross section toward an apex 70.

The front fin can define a forward line 72 that intersects a front face 43 of the front 42 in a forward direction. Similarly, the front fin 64 can define a rearward line 74 that intersects the front face 43 in a rearward direction. A backward line 76 can intersect the forward line 72 and rearward line 74 at the back of the fin. The backward line 76 can be a virtual line at various internal cross sections of the front fin 64 when, for example, the front fin is molded as a hollow structure. In general, the apex 70 is the farthermost portion from the backward line 76 at any given cross section along the front fin 64.

Further, an apex 70 can be formed on the front fin 64 and is generally the outermost portion of a fin. The apex 70 can be biased away from the forward line 72 to lessen the fin being a forward obstruction to air currents passing by the trailer. For example, the apex 70 can be farther away from the forward line 72 than the rearward line 74.

One or more side fins 78 can be formed on a side face 80 of the side 40. The side fins 78 help increase the structural integrity of the shell 20 in a vertical direction. Thus, the side fins are generally formed vertically, where "vertically" is defined herein as any direction having a vertical component greater than its horizontal component when the trailer is horizontal. The side fin can be tapered in cross section toward an apex 82. Further, the side fin 78 can also have a biased apex similar to the biased apex 70 on the front fin 64 and described in reference to FIG. 3. Further, the side 40 can have a smooth portion 81 that is formed absent the side fins 78 at which the fenders 18 can be mounted.

Advantageously, the fins are molded or otherwise coupled outwardly from the top, front, or side faces. One advantage is avoiding internal structure in the shell that lessens valuable storage space. The present invention is readily able to provide such construction due to its molding capabilities, described herein, in at least one embodiment.

Figure 3:
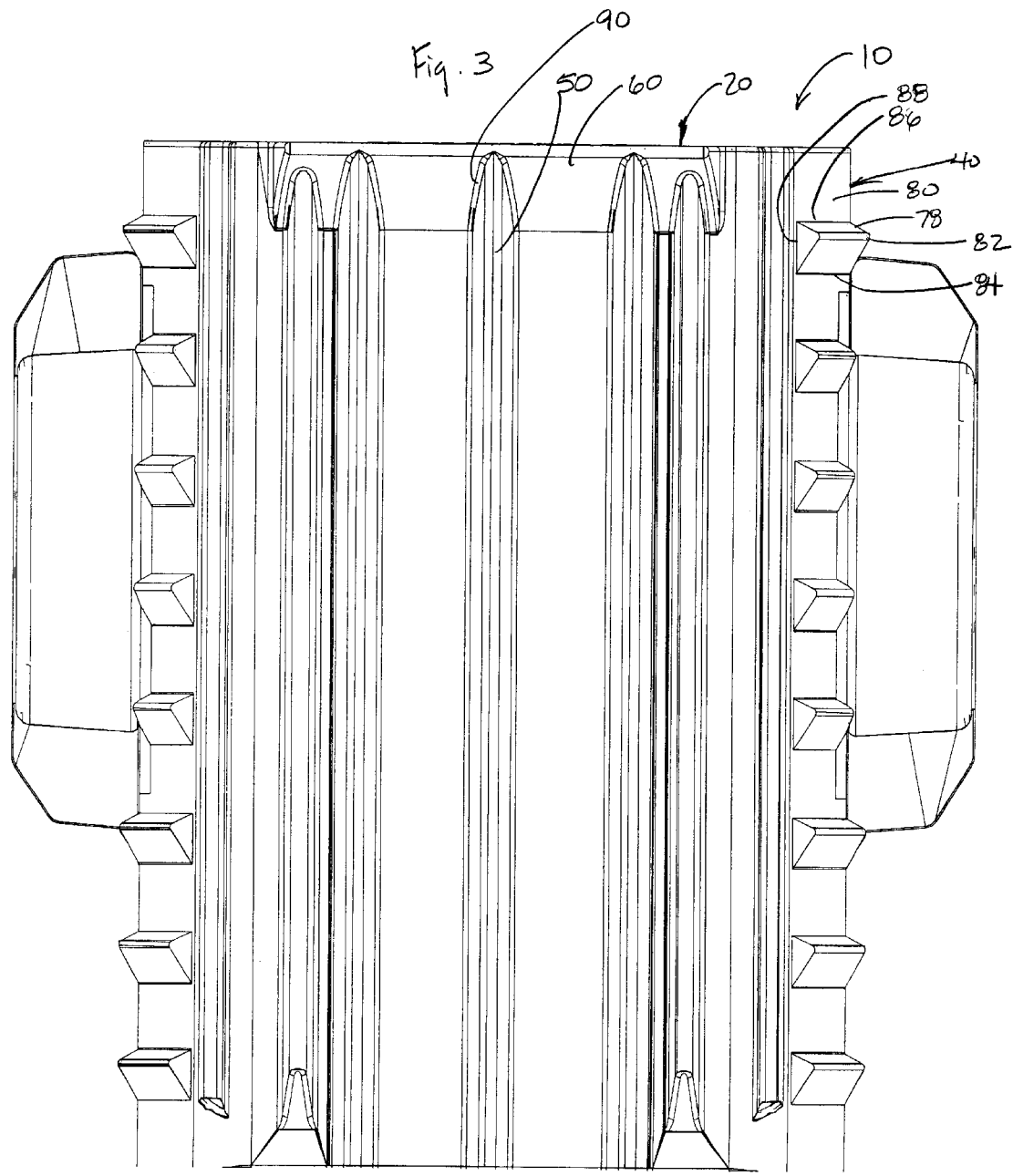
FIG. 3 is a schematic top view of the trailer showing side ribs.

FIG. 3 is a schematic top view of the trailer showing side ribs. One or more side fins 78 can extend outwardly from the side face 80 of the side 40. In at least one embodiment, an apex 82 formed on the side fin 78 can be biased rearwardly, similar to the above discussion regarding the front fin 64. For example, the side fin 78 can include a forward line 84 that can form a forward transition into the side face 80, a rearward line 86 that can form a rearward transition into the side face 80, and a backward line 88 disposed distally from the apex 82 that can form a backward transition to the side face 80. In a given cross section down the length of the side fin 78, the backward line 88 can intersect the forward line 84 and rearward line 86 and can be virtual when the side fin 78 is hollow. The apex 82, when biased rearwardly, can be farther away from the forward line 84 and closer to the rearward line 86. The biasing is believed to help reduce a frontal obstruction to air flowing past the fins.

The top fins, such as top fin 50, can form a smooth transition into the wind scoop 60, described in reference to FIG. 2. For example, the top fin 50 can have a rearward sloping surface 90 that forms a transition between the top fin 50 and the wind scoop 60. This smooth transition is believed to help air trapped between the top fins to smoothly transition across the surface of the wind scoop and over the trailer shell 20.

Figure 4:
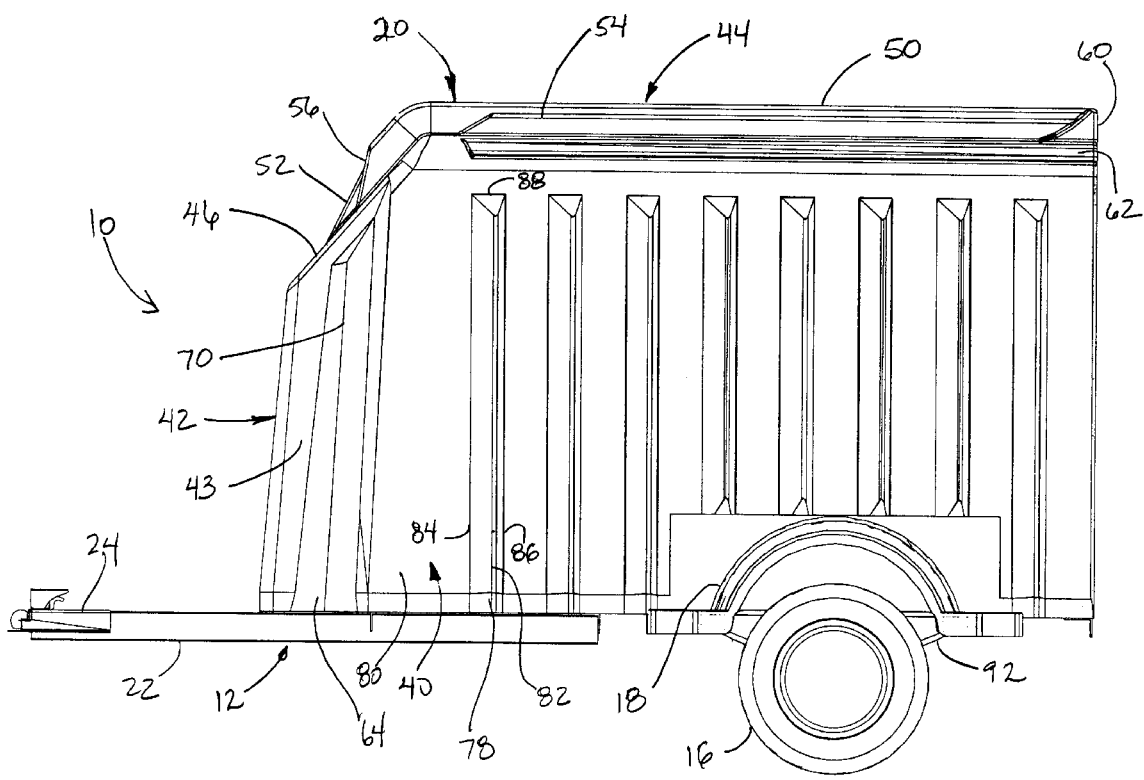
FIG. 4 is a schematic side view of the trailer.

FIG. 4 is a schematic side view of the trailer. The trailer 10 generally includes a frame 12, one or more wheels 16, and a shell 20. The frame 12 can include a tongue 22 coupled to a trailer hitch 24. Further, one or more fenders 18 can be coupled to the frame 12. In some embodiments having two wheels, an axle 28, shown in FIG. 1, can be used to couple the wheels together. Further, in some embodiments a spring 92 can be used to form a spring suspension system for the trailer. The front 42 can include one or more front fins 64. The front fin 64 generally includes an apex 70 that is distal from the surface of the front face 42. The top 44 includes one or more top fins 50, 54 that extend longitudinally along the top and transition to a wind scoop 60, if so provided. Further, the shell 20 can include the tapered surface 46 that forms a transition between the front 42 and the top 44. One or more of the top fins 50, 54 can extend down the tapered surface 46. The top fin 50 can include a forward sloping surface 52 and the top fin 54 can include a similar forward sloping surface 56. The forward sloping surfaces 52, 56 can have the same or different slopes.

One or more of the sides 40 of the shell 20 include one or more side fins 78. The side fins 78 include an apex 82 that can be biased rearwardly, that is, farther away from the forward line 84 than a rearward line 86. The apex is the farthest portion at any given cross section of the side fin away from a backward line 88 that intersects the forward line 84 and the rearward line 86. A corner groove 62 can be formed in the corner or other transition portion between the top 44 and the side 40.

Advantageously, the shell 20 is molded as substantially a unitary shell, although in other embodiments, portions of the shell can be molded separately and attached thereafter. In at least one embodiment, a technique known as rotational molding is used to mold the shell 20 complete with top, front, and side fins, and wind scoop. Rotational molding is also known as "roto-molding" or "rotational casting" and is a thermoplastic processing method for producing hollow parts. While molding techniques have been known for centuries, and rotational molding techniques for a few decades, molding a trailer shell with rotational molding to the knowledge of the inventor has never been accomplished or publicly revealed. The typical trailer shell is built with aluminum sheets with internal braces welded, riveted, or otherwise secured in position. While the need for efficient production is typically present, those with ordinary skill in the art did not consider the possibility of molding substantially the entire trailer shell structure, and especially the shell support structure described herein with the various fins.

Suitable materials for the present invention using rotational molding techniques include polyethylenes, such as low-density, linear low-density, high-density, cross-linked high density, and copolymers. Other materials can include nylon, polycarbonate, propylene, polyurethane, epoxy, acrylic, polyesters, polybutylene, phenolic, vinyl, and other synthetic materials. Thermal plastics and some thermal setting plastics can also be rotationally molded. Other materials include polyvinyl chloride with Durometer meter hardness ranges from about 60 Shore A to about 65 Shore D. Low-density polyethylene molding grades typically range from 0.915 to about 0.920 grams per cubic centimeter with a melt index of about 10 to about 25 grams per 10 minutes. Linear low-density polyethylene molding grades range from about 0.923 to about 0.949 grams per cubic centimeter with a melt index of about 3 to about 7 grams per 10 minutes. High-density polyethylene molding grades range from about 0.942 to about 0.950 grams per cubic centimeter with a melt index of about 2 to about 8 grams per 10 minutes. Copolymers, including ethylene vinyl acetate, molding grades range from about 0.925 to about 0.945 grams per cubic centimeter with a melt index of about 10 to about 25 grams per 10 minutes. Cross-linked polyethylene molding grades range from about 0.936 to about 0.941 grams per cubic centimeter. Each of the above materials has various flexural modulus pressures, tensile yield strengths, heat distortion temperatures, low-temperature impact strengths, and other factors which can vary depending on the particular use involved. Further, various additives can be included as would be known to those with ordinary skill in the art, such as colorants, anti-static agents, cross-linking agents, fillers, flame retardants, foam modifiers, foaming agents, glass fibers, heat stabilizers, impact modifiers, release agents, and ultra-violet stabilizers.

In an exemplary molding process, a premeasured amount of plastic material in liquid or powder form is placed in a cavity, and the mold is closed. The amount of material required is determined by the wall of thickness desired, size of the part, and other factors. The molding machine then indexes the mold into an oven where the mold and subsequently the plastic are brought up to the molding temperature. As the mold is heated, it is rotated substantially continuously about its vertical and horizontal axes. A reverse rotation can also be achieved to fill small intricacies and hidden areas in the mold. This multi-axial rotation brings various surfaces of the mold into contact with the puddle of plastic material. The mold continues to rotate within the oven until the plastic material has been picked up by the hot inside surfaces of the mold cavity. The mold continues to rotate until the plastic material densifies into a uniform layer of melt. While continuing to rotate, the machine moves the mold out of the oven and into a cooling chamber. Air or a mixture of air and water cools the mold and the layer of molten plastic material. This cooling process continues until the part has cooled substantially to retain its shape. The machine then indexes the mold to the loading and unloading station. The mold is opened and the part is removed. A new batch of material is then placed in the cavity, the mold is closed, and the process is repeated.

In many instances, the oven, cooler, and load/unload station are arranged in a circle around the molding machine, so that the molding machine can rotate on an axis and insert and remove the mold in and out of the various stations as the molding machine rotates. Other layouts can include linear layouts using robotic machines, conveyors, and other material handlers.

One supplier of rotational molding machines is Ferry Industries from Stowe, Ohio, United States. As one example, Ferry produces an independent-arm machine having multiple arms and stations. This type of independent-arm machine includes each arm on a separate cart. Each cart indexes about a center pivot post and shares a common load-bearing tract. Various stations can include oven, pre-cooled, cooling, unload, and load. Furthermore, additional ovens and additional cooling stations are available. There are several different types of rotational molding equipment and the above description is merely exemplary and non-limiting.

While the foregoing is directed to various embodiments of the present invention, other and further embodiments can be devised without departing from the basic scope thereof. For example, the various methods and embodiments of the invention can be included in combination with each other to produce variations of the disclosed methods and embodiments. Discussion of singular elements can include plural elements and vice-versa. Likewise, the use of "comprising" in the claims is meant to include at least the elements or steps recited and can include other like elements or steps and/or other different elements or steps. Also, any directions shown or described such as "top," "bottom," "left," "right," "upper," "lower," and other directions and orientations are described herein for clarity in reference to the figures and are not to be limiting of the actual device or system or use of the device or system. The device or system can be used in a number of directions and orientations. Further, the order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions. Additionally, any headings herein are for the convenience of the reader and are not intended to limit the scope of the invention.

Further, any references mentioned in the application for this patent as well as all references listed in the information disclosure originally filed with the application are hereby incorporated by reference in their entirety to the extent such may be deemed essential to support the enabling of the invention(s). However, to the extent statements might be considered inconsistent with the patenting of the invention (s), such statements are expressly not meant to be considered as made by the Applicants.

What is claimed is:

1. An aerodynamic trailer, comprising:
    a. a frame;
    b. a shell coupled to the frame, the shell having a top, a side and a front and a forward sloping surface disposed between the top and front and at least one top fin disposed longitudinally along the top and extending at least partially down the forward sloping surface.

2. The trailer of claim 1, wherein the shell further comprises at least one side fin coupled to the side and extending vertically and outwardly therefrom.

3. The trailer of claim 2, wherein the at least one side fin defines an apex biased further from a forward line of intersection with the face of the side than a reward line of intersection with the face of the side.

4. The trailer of claim 2, wherein the at least one side fin defined a tapered cross section along its height outwardly from the face of the side.

5. The trailer of claim 1, wherein the at least one top fin defines a tapered cross section along its height outwardly from the face of the top.

6. The trailer of claim 1, further comprising a wing scoop coupled to the top.

7. The trailer of claim 6, wherein the wind scoop is disposed distally from the forward portion of the shell in proximity to a reward portion of the shell.

8. The trailer of claim 1, wherein the shell defined a longitudinal corner groove formed in proximity to an intersection between the top and side of the shell.

9. The trailer of claim 1, further comprising two wheels coupled to the frame.

10. The trailer of claim 1, further comprising a fender coupled to the frame.

11. The trailer of claim 1, further comprising a door coupled to the frame.

12. An aerodynamic trailer having a top, a side and a front face and a forward sloping surface disposed between the top and front face and further comprising at least one top fin disposed longitudinally along the top and extending at least partially down the forward sloping surface.

13. The trailer of claim 12, further comprising at least one side fin extending vertically and outwardly from a side of the trailer.

14. The trailer of claim 13, wherein the at least one side fin defines an apex biased further from a forward line of intersection with the face of the side than a reward line of intersection with the face of the side.

15. The trailer of claim 13, wherein the at least one side fin defines a tapered cross section along its height outwardly from the face of the side.

16. The trailer of claim 12, further comprising at least one from fin extending vertically and outwardly from the front face of the trailer.

17. The trailer of claim 12, further comprising a wind scoop coupled to the top and having a tapered surface formed facing a forward portion of the trailer.

18. The trailer of claim 16, wherein the lower portion of the at least one front fin is wider and shallower than the upper portion of the at least one front fin.

19. The trailer of claim 16, wherein the at least one front fin defines an apex biased further from a forward line of intersection with the face of the front than a reward line of intersection with the face of the front.

20. An aerodynamic trailer comprising:
  a. two side faces;
  b. a front face extending between the side faces;
  c. a top face extending from the front face rearwardly between the side faces;
  d. a tapered frontal surface coupled between the top face and the front face; and
  e. at least one top fin disposed longitudinally along the top face of the trailer and extending outwardly onto the tapered frontal surface.

21. The trailer of claim 20, wherein the tapered frontal surface comprises a forward sloping surface disposed between the top face and the front face of the trailer.

22. The trailer of claim 20, wherein the trailer further comprises at least one from fin extending vertically and outwardly from the front face of the trailer.

23. The trailer of claim 20, further comprising at least one side fin extending vertically and outwardly from a side of the trailer.

24. The trailer of claim 23, wherein the at least one side fin defines an apex biased further from a forward line of intersection with the face of the side than a rearward line of intersection with the face of the side.

25. The trailer of claim 20, further comprising a wind scoop coupled to the top and having a tapered surface formed facing a forward portion of the trailer.

26. The trailer of claim 22, wherein the lower portion of the at least one front fin is wider and shallower than the upper portion of the at least one front fin.

27. The trailer of claim 22, wherein the at least one front fin defines an apex biased further from a forward line of intersection with the face of the front than a rearward line of intersection with the face of the font.

* * * * *

UNITED STATES PATENT AND TRADEMARK OFFICE
CERTIFICATE OF CORRECTION

PATENT NO. : 6,634,700 B1
DATED : October 21, 2003
INVENTOR(S) : Phillip D. Calvert It is certified that error appears in the above-identified patent and that said Letters Patent is hereby corrected as shown below:

<u>Column 8,</u>
Line 46, delete "reward" and insert -- rearward --
Lines 49 and 59, delete "defined" and insert -- defines --

<u>Column 9,</u>
Lines 11 and 27, delete "reward" and insert -- rearward --
Line 17, delete "from" and insert -- front --

<u>Column 10,</u>
Line 12, delete "from" and insert -- front --

Signed and Sealed this

Sixteenth Day of December, 2003

JAMES E. ROGAN
*Director of the United States Patent and Trademark Office*